(12) United States Patent
Simpson et al.

(10) Patent No.: US 9,736,177 B2
(45) Date of Patent: *Aug. 15, 2017

(54) AUTOMATED SECURITY TESTING

(71) Applicant: HEWLETT PACKARD ENTERPRISE DEVELOPMENT LP, Houston, TX (US)

(72) Inventors: Shawn Morgan Simpson, Alpharetta, GA (US); Philip Edward Hamer, Alpharetta, GA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/003,262

(22) Filed: Jan. 21, 2016

(65) Prior Publication Data
US 2016/0142434 A1 May 19, 2016

Related U.S. Application Data

(63) Continuation of application No. 14/115,648, filed as application No. PCT/US2011/038550 on May 31, 2011, now Pat. No. 9,276,952.

(51) Int. Cl.
*H04L 29/06* (2006.01)

(52) U.S. Cl.
CPC ...... *H04L 63/1433* (2013.01); *H04L 63/1466* (2013.01)

(58) Field of Classification Search
None
See application file for complete search history.

(56) References Cited

U.S. PATENT DOCUMENTS

| | | | |
|---|---|---|---|
| 7,073,198 B1 | 7/2006 | Flowers et al. | |
| 7,243,148 B2 | 7/2007 | Keir et al. | |
| 7,343,625 B1* | 3/2008 | Zaidi | G06F 17/30899 |
| | | | 707/E17.119 |
| 7,831,995 B2 | 11/2010 | Futoransky et al. | |
| 8,201,251 B2 | 6/2012 | Ngalle | |
| 8,601,586 B1* | 12/2013 | Boutros | H04L 63/1433 |
| | | | 709/217 |
| 9,276,952 B2* | 3/2016 | Simpson | G06F 21/577 |
| 2003/0195861 A1 | 10/2003 | McClure | |

(Continued)

FOREIGN PATENT DOCUMENTS

| | | |
|---|---|---|
| CN | 101238475 A | 8/2008 |
| JP | 2005-266954 | 9/2005 |

(Continued)

OTHER PUBLICATIONS

International Searching Authority,Appl. No. PCT/US2011/038550 filed May 31, 2011, Search Report and Written Opinion dated Feb. 9, 2012.

(Continued)

*Primary Examiner* — Kaveh Abrishamkar

(57) ABSTRACT

A method of automated security testing includes recording a macro. The recorded macro is played and a web request is intercepted while playing the macro. The web request may be attacked and sent to a web server. A response from the web server based on the web request is received, and the response of the web server is processed to determine any vulnerabilities.

19 Claims, 4 Drawing Sheets

(56) References Cited

U.S. PATENT DOCUMENTS

| | | |
|---|---|---|
| 2006/0070075 A1 | 3/2006 | Rodionov |
| 2006/0137014 A1 | 6/2006 | Hurst |
| 2007/0050686 A1 | 3/2007 | Keeton et al. |
| 2007/0143852 A1 | 6/2007 | Keanini |
| 2007/0186285 A1* | 8/2007 | Hurst .................... G06F 21/577 726/25 |
| 2008/0209567 A1 | 8/2008 | Lockhart |
| 2008/0263671 A1 | 10/2008 | Solino Testa |
| 2008/0320567 A1 | 12/2008 | Shulman |
| 2011/0061104 A1 | 3/2011 | Sarraute Yamada et al. |

FOREIGN PATENT DOCUMENTS

| | | |
|---|---|---|
| JP | 2010-250583 A | 11/2010 |
| WO | WO-2011009295 A1 | 1/2011 |

OTHER PUBLICATIONS

Somnath Guha Neogi, itSpice, Web 2.o Security Testing—Approach Note, 7 pages, http://itspice.net/cms/software-testing-and-quality/web-2-0-security-testing-approach-note, Jun. 9, 2011.
Srinath Anantharaju, Automating web application security testing, Jul. 16, 2007, 8 pages, http://googleonlinesecurity.blogspot.com/2007/07/automating.web.application.security.html.
Supplementary European Search Report, Dec. 16, 2014, European Patent Application 11866810.2, 6 pages.

\* cited by examiner

AUTOMATED SECURITY TESTING

CROSS-REFERENCE TO RELATED APPLICATION

This application is a Continuation Application of co-pending U.S. patent application Ser. No. 14/115,648, having a filing date of Nov. 5, 2013, and entitled "AUTOMATED SECURITY TESTING," which claims the benefit of priority under 35 U.S.C. §371 to PCT Patent Application No. PCT/US2011/038550, filed on May 31, 2011, the disclosures of which are hereby incorporated by reference in their entireties.

BACKGROUND

A number of businesses maintain an online presence and conduct much of their commerce and business operations using the Web. Often times, the businesses engage aspects of the Web known as Web 2.0, which may refer to information sharing across the Web where the Web is viewed as a platform for user centered design. Having a secure web page is one technique to ensure that businesses maintain the integrity of their online data and continue to function properly on the Web and Web 2.0. Consequently, web page security is routinely validated.

Manual penetration testing is one technique of security validation. In manual penetration testing, an attack from a malicious source is simulated on a web page. An attack typically includes inserting malicious code into communications with the web page. A user may manually analyze the web site for vulnerabilities that have been exposed through the attack. However, many web pages are quite large and extensive, so vulnerabilities can be missed during a manual analysis. Additionally, web site administrators may be unaware of some applications residing on various web pages throughout a network, and vulnerabilities related to those applications may be missed as well. Further, business processes can be hard to test, and source code may not be fully covered by a manual attack, allowing for more missed vulnerabilities.

Alternatively, a transport level attack mechanism may be used to test for vulnerabilities. The transport level attacks may be created by enclosing various parameters within a web request, including attack code. The request may be sent to the server for processing. A vulnerability may be found, based on the attack, if the server responds to the request in a manner expected when such a vulnerability is present.

A crawl and audit technique may also be used to discover vulnerabilities, and is typically used by working statically with each link resulting in a request to and a response from the server. Additionally, the crawl and audit technique is performed automatically, without user interaction or the aid of a web browser. User traffic is not recorded, therefore no authentication data is available to access Web 2.0 applications.

BRIEF DESCRIPTION OF THE DRAWINGS

Certain exemplary embodiments are described in the following detailed description and in reference to the drawings, in which.

DETAILED DESCRIPTION

An embodiment of the present techniques may detect web page security vulnerabilities automatically by recording user interaction with a web browser. Also, an embodiment of the present techniques may create macros that can be recorded and played on a web browser, and inject attacks into events played by the macros. The playback of the macros may be used to discover new vulnerabilities during a fully automated vulnerability scan of a web site. Further, an embodiment of the present techniques may automatically login to web pages and maintain the state of various web pages using a playback of a recorded macro containing user interaction with a web browser. Web requests may be made during playback of the recorded macro in order to discover new links, find attack points in the web application, make attacks, and discover vulnerabilities.

Figure 1:
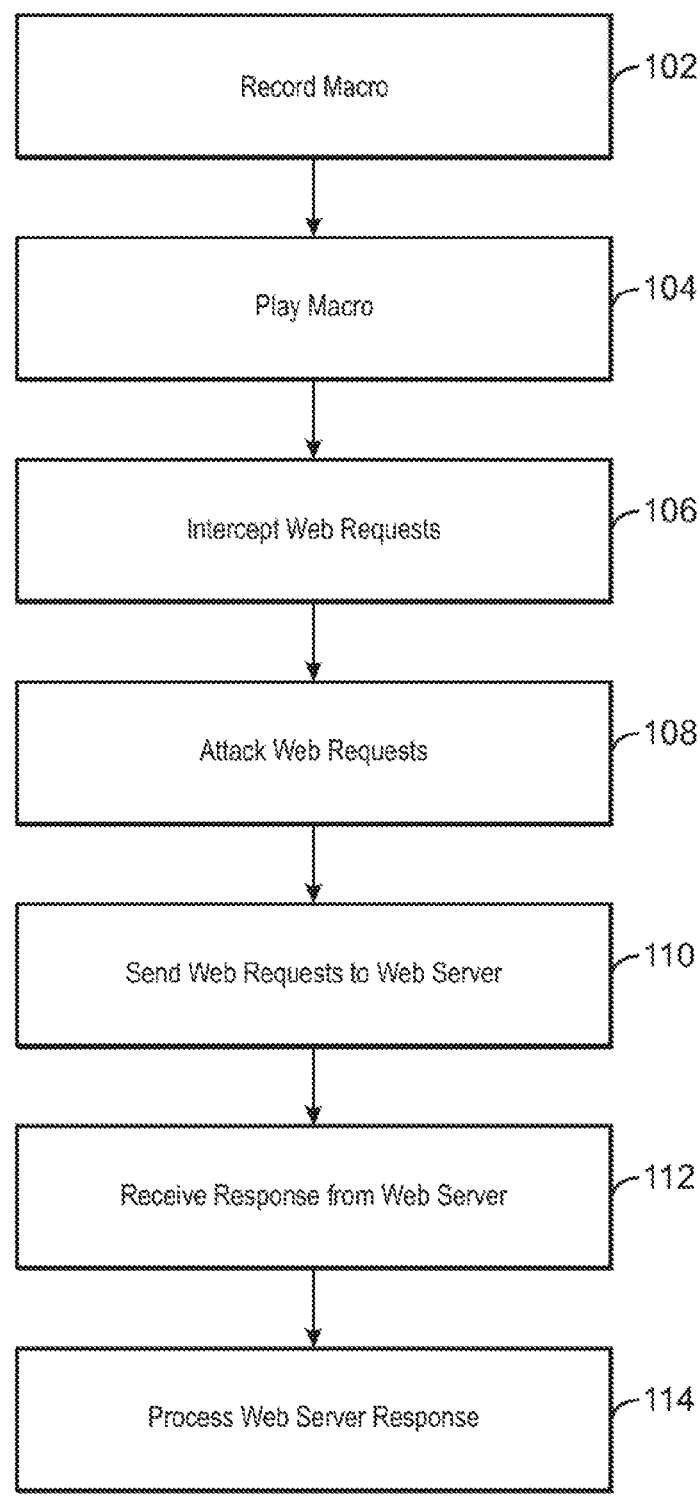
FIG. 1 is a process flow diagram showing a computer-executed method for automated security testing according to an embodiment of the present techniques.

FIG. 1 is a process flow diagram showing a computer-executed method 100 for automated security testing according to an embodiment. At block 102, a macro is recorded. As used herein, a macro is a software recording of a series of actions or inputs, which may be played back to repeat the actions or inputs. The macro may include operation of elements of a web page, modification of attributes of the elements, changes to the location of the elements in a document object model (DOM), and any siblings of the elements. Elements may also be based on events that result from user interaction with a web browser. As a result, the macro may record the user's interactions with the web browser. The user can interact with the web browser in any manner corresponding to a business process to be recorded as selected by the user, such as logging into a web page or viewing profile information. Event handlers may also be used to record the macros.

The user may also select elements of the web page to record, such as elements indicative of a logged in state or a logged out state. For example, a button that says "Sign In" on a web page may indicate a logged out state. Further, the user can define a set of questions and answers to be included in the macro and used for dynamic security questions presented by the web page for authentication purposes. The location of the dynamic security questions may also be recorded. For example, a banking web site can prompt the user for the answers to a series of pre-configured questions, as part of a "security-in-depth" approach, such as "What is your cat's favorite ball?" These questions may be overcome during a vulnerability scan when the user defines the set of questions and answers to include in the macro.

As noted herein, when the user initiates an action within the browser, the element attributes, where the element exists in the DOM, and other relevant information about the DOM such as the siblings of the element and if the element is part of a form may be recorded. By recording information about each element in this manner, the same element may be found in subsequent changes to the DOM, even if the layout of the DOM is different. Generally, the DOM is an application programming interface for HTML and XML documents. The DOM may define the logical structure of the HTML and XML documents of a web site and control the manner in which a document is accessed and manipulated. A web page's DOM structure may change during user interactions with Web 2.0 applications, thus logically or structurally changing the elements within the DOM.

Elements within the DOM may be found using a scan engine when the DOM structure changes while the macro is being recorded. Initially, the scan engine may find an element within the DOM based on information such as tag name, element ID, and element name. If the initial search for an element of the DOM search does not find an element with the same tag name at the same location in the DOM as the element searched for, the recorded element may be found based on its exact location or based on its location relative to other elements in the DOM. This flexibility in finding an element within the DOM allows for vulnerabilities to be discovered as dynamic changes to the DOM occur when interacting with Web 2.0 applications.

At block 104, the recorded macro is played. Playing the macro may be used to validate that the correct steps were captured and the desired browser state is achieved during the playback. The macro may be initially played to establish state, as well as populate a crawl with uniform resource locators (URLs) that were visited by the macro. The crawl may be used to provide an attack surface to an audit engine, which may perform attacks as described below. Further, the audit engine may be a portion of the scan engine.

After the initial macro playback, the web page may be checked for elements indicative of a logged out state that were recorded in the macro during subsequent macro playbacks. If these elements are found, the macro playback may be paused and the macro may be replayed in order to reestablish a logged in state so a practical analysis can be performed. An analysis may be severely limited in a logged out state, and key vulnerabilities may not be discovered if the playback remains in a logged out state.

At block 106, a web request made during the macro playback is intercepted by a proxy server. A proxy server may be configured to intercept traffic from the web browser during playback of the macro within the web browser. Further, the proxy server may provide the web request to the audit engine. At block 108, the web request is attacked. The attack may be performed by the audit engine. Attacking the web request may include injecting malicious code into the request, thereby attempting to exploit some functionality not intended by the user within the web request. Additionally, the web request may be attacked during playback of the macro. In the case of cross site scripting, a cross site scripting payload may be injected into the web request.

At block 110, the web request is sent to a web server. The web server may be the original destination of the web request before it is intercepted and sent to the proxy server. At block 112, a response is received from the web server based on the web request. At block 114, the response of the web server is processed to determine any vulnerabilities. For each attack that is made, there is a corresponding rule as to what constitutes a vulnerability. Typically, this rule is a regular expression that can be run on the response text by an audit engine. If the rule is satisfied, the vulnerability exists at that web page. Complex audit engines can have a state associated with them such that the processing of the response may be dependent on the success of past attacks.

Figure 2:
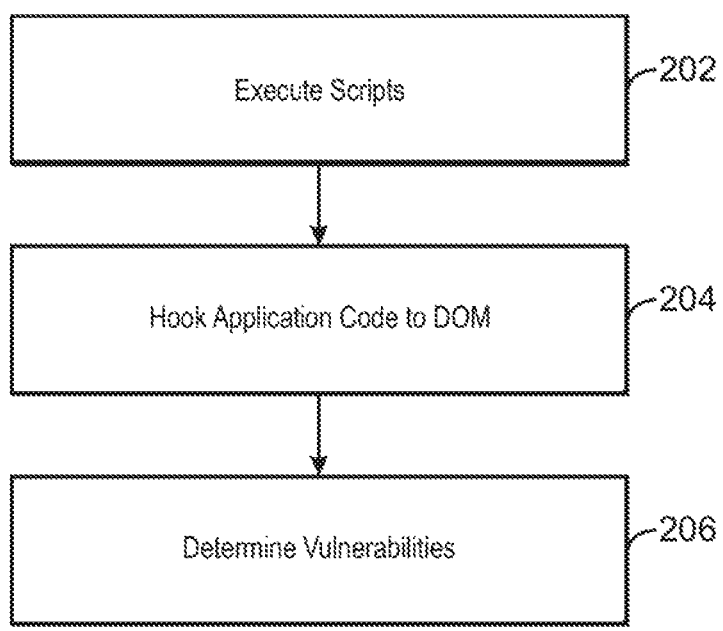
FIG. 2 is a process flow diagram showing a computer-executed method for automated security testing according to an embodiment of the present techniques.

FIG. 2 is a process flow diagram showing a computer-executed method 200 for processing a web server response to determine any vulnerabilities according to an embodiment. Some vulnerabilities may be revealed when the browser handles the response instead of an audit engine. At block 202, scripts in the response may be executed within the web browser. At block 204, several DOM methods may be hooked, or linked, to application code that may be executed when a DOM method is executed. In this scenario, the vulnerability may be detected by passing the response to the browser and hooking several DOM methods to the application code that may be called during the script execution of the response. At block 206, vulnerabilities may be determined based on the particular DOM methods called during script execution, as noted by the application code execution.

The present techniques may be used to detect cross-site scripting vulnerabilities. For example, consider an asynchronous JavaScript and XML (AJAX) driven web site that allows a user to edit and view his profile information. The editing of profile information may be triggered when the user clicks an "Edit" button, which has a JavaScript event handler. Once edited, a "Save" button can send the AJAX request to the web server for storage. Furthermore, a "View" button may be clicked to display this profile information. When the View button is clicked, JavaScript may be executed which sends a second AJAX request to retrieve profile data from the server, and this data can be transformed into DOM elements and rendered in the browser. Each of the Edit, Save, and View buttons may be elements of the AJAX driven page.

JavaScript events may be triggered when a button is clicked or JavaScript that modifies the username and password values before the POST occurs. POST is a web request, used by the client to send data to the server as part of the request, such as when submitting form data to the server. Input sanitization may occur when a randomly-named hidden form input is generated for each form, and the server checks for the presence of the parameter in the web request. Generally, input sanitization includes validating the user input, such as form data and cookies, on the client side before the input is sent to the web server. Input sanitization techniques may be used to prevent cross site request forgery (CSRF), and can make replay of the web requests by an automated engine difficult, as replaying the same sequence of requests will not authenticate the user. Moreover, in order to attack these complex applications, the user's state should be known prior to each injected attack, such as an SQL injection or cross site scripting.

If the profile information is transformed into DOM elements without input sanitization, then a cross-site scripting vulnerability may exist. Thus, cross-site scripting vulnerabilities are typically found in web applications that enable attackers to inject client side script into web pages viewed by other users. In order to detect this vulnerability, DOM events that occur when the user interacts with the browser may be repeated in a particular sequence using a web browser to mimic the conditions where vulnerabilities may occur. The DOM events may be closely monitored to accurately detect the execution of the attack's payload.

To record the client-side events that may lead to cross-site scripting vulnerabilities, macros may be recorded by "hooking" event handlers to both the DOM of the currently rendered web page as well as a change event handler to the base of the DOM, as described at block 102 (FIG. 1). Elements may fire a series of events, allowing a chain of event handlers to be "hooked" to the elements such that the event handlers are called whenever a particular event is fired.

The event handlers may send notifications whenever user interactions with the web page are detected to the web browser or the scan engine. A series of elements based on events that result from user interaction with the web browser may be recorded and then played at will to simulate user interaction with the web browser. The macro may include questions and answers to satisfy security validation requirements as well as other information to successful authenticate the playback session.

A scan engine may present an instance of the web browser that is programmed to play the recorded macro, as described at block 104 (FIG. 1). As the web browser navigates during the playback of the macro, the DOM may be manipulated using the scan engine and the same elements the user interacted with during the recording are manipulated. For example, Save, Edit, View, Click, Navigate, Set Value elements can be manipulated during a playback just as they would with actual user interaction. Additionally, the client-side JavaScript may run just as it would with user interaction.

A proxy server may be configured to intercept traffic from the web browser while playback of the macro occurs, and a web request may be intercepted while playing the macro, as described at block 106 (FIG. 1). The web request may be attacked using the proxy server while the playback of the macro is in process, as described at block 108 (FIG. 1). Depending on the type of attack, playback may be stopped. The web server responds to the attacked web request that is sent to it from the proxy server, as described at blocks 110 and 112 (FIG. 1). Behavior at this point diverges, depending on the type of audit engine processing the attack. Audit engines can process the web server response and determine if a vulnerability exists, as described at block 114 (FIG. 1). Playback of the macro may proceed until it is complete, examining each new response for a vulnerability indication.

When detecting cross-site scripting vulnerabilities, the web browser executes the script sent in the attack, as described at block 202 (FIG. 2). In this scenario, the vulnerabilities occur in the client side script and may not send data to the web server. Accordingly, the state of the web browser DOM is important when attacking these web requests. As discussed above, the web browser DOM may define the logical structure of HTML and XML documents of the web site and control the manner in which a document is accessed and manipulated. The web browser DOM may be hooked to application code, and the application code may provide notifications of the DOM method called, as described at block 204 (FIG. 2). For example, the application code linked to the DOM method may be a cross site scripting payload sent in the attack. As a result, vulnerabilities may be determined when the web browser calls a particular DOM method that is expected to be called when there are vulnerabilities present, as described at block 206 (FIG. 2). Notification of the vulnerabilities may occur as they arise. As a result, vulnerabilities are accessible that may not be accessible in a purely transport layer attack.

Figure 3:
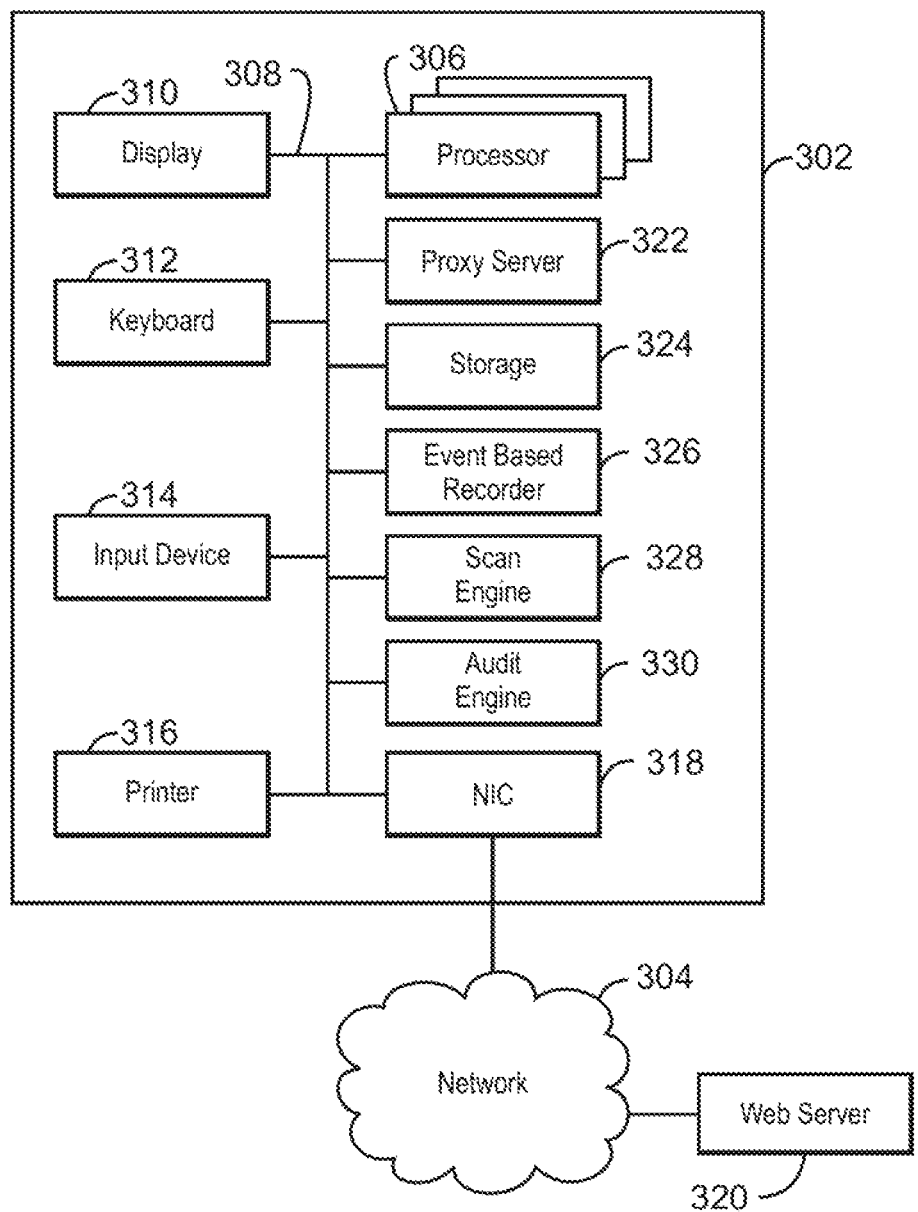
FIG. 3 is a block diagram of a system that may provide automated security testing according to an embodiment of the present techniques.

FIG. 3 is a block diagram of a system that may provide automated security testing according to an embodiment of the present techniques. The system is generally referred to by the reference number 300. Those of ordinary skill in the art will appreciate that the functional blocks and devices shown in FIG. 3 may comprise hardware elements including circuitry, software elements including computer code stored on a tangible, machine-readable medium, or a combination of both hardware and software elements. Additionally, the functional blocks and devices of the system 300 are but one example of functional blocks and devices that may be implemented in an embodiment. Those of ordinary skill in the art would readily be able to define specific functional blocks based on design considerations for a particular electronic device.

The system 300 may include a testing computer 302, connected to a network 306. As illustrated in FIG. 3, the testing computer 302 may include one or more processors 306 which may be connected through a bus 308 to a display 310, a keyboard 312, one or more input devices 314, and an output device, such as a printer 316. The input devices 314 may include devices such as a mouse or touch screen. The processors 306 may include a single core, multiple cores, or a duster of cores in a cloud computing architecture. The testing computer 302 may also be connected through the bus 308 to a network interface card (NIC) 318. The NIC 318 may connect the testing computer 302 to the network 304.

The network 304 may be a local area network (LAN), a wide area network (WAN), or another network configuration. The network 304 may include routers, switches, modems, or any other kind of interface device used for interconnection. The network 304 may connect to a web server 320. Although not shown, the web server 320 may connect to various other computers through a network 306.

The testing computer 302 may have other units operatively coupled to the processor 306 through the bus 308, such as a local proxy server 322. Other units operatively coupled to the processor 306 through the bus 308 may include tangible, machine-readable storage media, such as storage 324, an event based recorder module 326, a scan engine 328, and an audit engine 330. The storage 324 may include any combinations of hard drives, read-only memory (ROM), random access memory (RAM), RAM drives, flash drives, optical drives, cache memory, and the like. Although the proxy server 322, event based recorder module 326, the scan engine 328, and the audit engine 330 are shown to reside on testing computer 302, a person of ordinary skill in the art would appreciate that these units may reside on the testing computer 302 or on any other computer connected to the testing computer 302.

Figure 4:
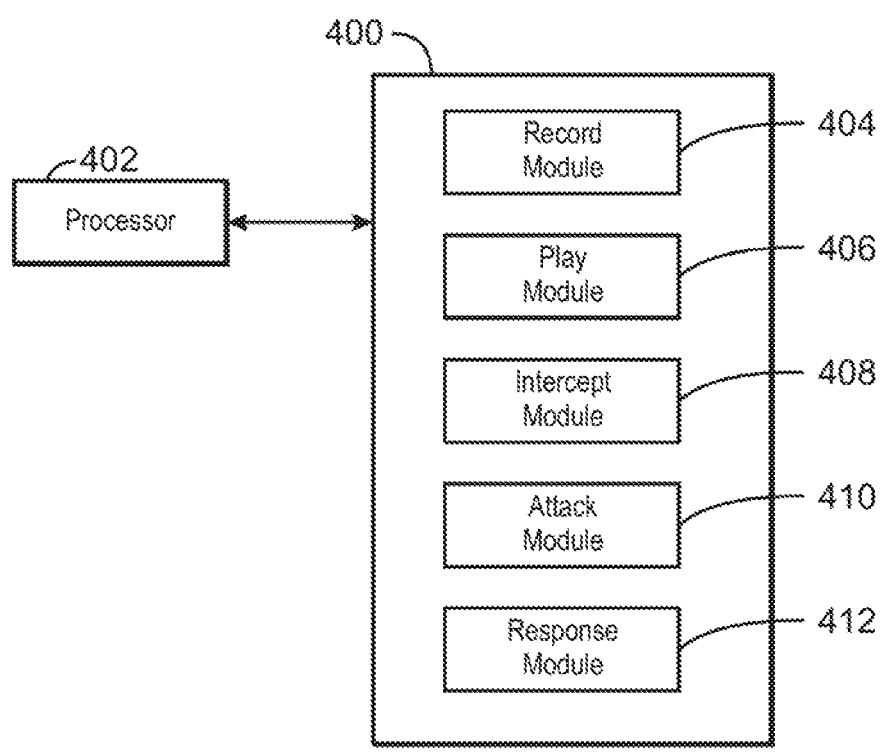
FIG. 4 is a block diagram showing a non-transitory, computer-readable medium that stores code for automated security testing according to an embodiment of the present techniques.

FIG. 4 is a block diagram showing a non-transitory, computer-readable medium that stores code for automated security testing according to an embodiment of the present techniques. The non-transitory, computer-readable medium is generally referred to by the reference number 400.

The non-transitory, computer-readable medium 400 may correspond to any typical storage device that stores computer-implemented instructions, such as programming code or the like. For example, the non-transitory, computer-readable medium 400 may include one or more of a non-volatile memory, a volatile memory, and/or one or more storage devices.

Examples of non-volatile memory include, but are not limited to, electrically erasable programmable read only memory (EEPROM) and read only memory (ROM). Examples of volatile memory include, but are not limited to, static random access memory (SRAM), and dynamic random access memory (DRAM). Examples of storage devices include, but are not limited to, hard disks, compact disc drives, digital versatile disc drives, and flash memory devices.

A processor 402 generally retrieves and executes the computer-implemented instructions stored in the non-transitory, computer-readable medium 400 for automated security testing. At block 404, a record module, when executed, causes the processor to record a macro. The macro may include various elements of the web page, and is recorded while the user interacts with the web page. At block 406, a play module, when executed, causes the processor to play the macro. The macro may be played in a web browser. At block 408, an intercept module, when executed, causes the processor to intercept a web request from the macro playback. The web request may be intercepted during the macro playback. At block 410, an attack module, when executed, causes the processor to attack the web request. The web request may be attacked by injecting malicious code into the web request. At block 412, a response module, when executed, causes the processor to determine vulnerabilities by processing the response of the web server to the web attack. Vulnerabilities may also be determined by the particular DOM methods called by script execution when scripts in the response are executed within a web browser and the DOM methods are hooked to application code. Further, scripts in the response may be executed within the web browser, and several DOM methods may be hooked, to application code that may be executed when a DOM method is executed. Vulnerabilities may be determined based on the document object model method called during script execution as noted by the execution of the application code.

What is claimed is:

1. A non-transitory machine-readable storage medium encoded with instructions executable by a processor of a computing device, the non-transitory machine-readable storage medium comprising instructions to:
   intercept a web request from a web browser while playing a recorded macro, wherein the macro comprises a series of actions related to a web page;
   attack the web request;
   send the web request to a webserver; and
   process a response of the web server based on the web request to determine any vulnerabilities.

2. The non-transitory machine-readable storage medium of claim 1, further comprising instructions to determine, in response to executing a script within the web browser, vulnerabilities based on the document object model hooked to application code of the script.

3. The non-transitory machine-readable storage medium of claim 1, further comprising instructions to inject malicious code into the web request.

4. The non-transitory machine-readable storage medium of claim 1, further comprising instructions to record a macro by recording a user's interactions with the web browser.

5. The non-transitory machine-readable storage medium of claim 1, further comprising instructions to record a macro by finding an element of the document object model after the document object model has been changed based on the element's location relative to at least one of other elements in the document object model, a tag name, an element ID, or an element name.

6. The non-transitory machine-readable storage medium of claim 1, further comprising instructions to record a macro by defining an element for recording, wherein the element is indicative of a logged out, a logged in state, or a set of questions and answers.

7. The non-transitory machine-readable storage medium of claim 1, further comprising instructions to record a macro by recording an element of a web page using an event handler.

8. The non-transitory machine-readable storage medium of claim 1, further comprising instructions to attack the web request while playing the recorded macro.

9. The non-transitory machine-readable storage medium of claim 1, wherein the web request is sent to the web server that is an original destination of the web request before it is intercepted.

10. The non-transitory machine-readable storage medium of claim 1, further comprising instructions to add a corresponding rule as to what constitutes a vulnerability to the web request.

11. A non-transitory machine-readable storage medium encoded with instructions executable by a processor of a computing device, the non-transitory machine-readable storage medium comprising instructions to:
    intercept a web request from a web browser while playing a recorded macro, wherein the macro comprises a series of actions related to a web page;
    inject malicious code into the web request;
    send the web request to a webserver; and
    process a response of the web server based on the web request to determine any vulnerabilities.

12. The non-transitory machine-readable storage medium of claim 11, further comprising instructions to determine, in response to executing a script within the web browser, vulnerabilities based on the document object model hooked to application code of the script.

13. The non-transitory machine-readable storage medium of claim 11, wherein the web request is sent to the web server that is an original destination of the web request before it is intercepted.

14. The non-transitory machine-readable storage medium of claim 11, further comprising instructions to add a corresponding rule as to what constitutes a vulnerability to the web request.

15. The non-transitory machine-readable storage medium of claim 11, wherein the macro is recorded by at least one of:
    recording a user's interactions with the web browser;
    finding an element of the document object model after the document object model has been changed based on the element's location relative to at least one of other elements in the document object model, a tag name, an element ID, or an element name;
    defining an element for recording, wherein the element is indicative of a logged out, a logged in state, or a set of questions and answers; or
    recording an element of a web page using an event handler.

16. A method for execution by a computing device for generating attributes for changing an outcome of a predictive model, comprising:
    intercepting a web request from a web browser while playing a recorded macro, wherein the macro comprises a series of actions related to a web page;
    injecting, into the web request, malicious code and a corresponding rule as to what constitutes a vulnerability;
    sending the web request to a webserver; and
    processing a response of the web server based on the web request to determine any vulnerabilities.

17. The method of claim 16, further comprising determining, in response to executing a script within the web browser, vulnerabilities based on the document object model hooked to application code of the script.

18. The method of claim 16, wherein the web request is sent to the web server that is an original destination of the web request before it is intercepted.

19. The method of claim 16, further comprising recording the macro by at least one of:
    recording a user's interactions with the web browser;
    finding an element of the document object model after the document object model has been changed based on the element's location relative to at least one of other elements in the document object model, a tag name, an element ID, and an element name;
defining an element for recording, wherein the element is indicative of a logged out, a logged in state, or a set of questions and answers; or
recording an element of a web page using an event handler.

\* \* \* \* \*